(12) United States Patent
Takano et al.

(10) Patent No.: US 8,832,183 B2
(45) Date of Patent: Sep. 9, 2014

(54) METHOD FOR COMMUNICATION BETWEEN SERVER PROCESSING APPARATUS AND CLIENT PROCESSING APPARATUS

(75) Inventors: Hideki Takano, Kawasaki (JP); Shunsuke Akifuji, Wako (JP); Tatsuaki Osafune, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 13/216,612

(22) Filed: Aug. 24, 2011

(65) Prior Publication Data

US 2012/0215835 A1 Aug. 23, 2012

(30) Foreign Application Priority Data

Sep. 17, 2010 (JP) ................................. 2010-209643

(51) Int. Cl.
*G06F 15/16* (2006.01)
*H04W 4/00* (2009.01)
*H04L 29/08* (2006.01)
*H04L 29/06* (2006.01)

(52) U.S. Cl.
CPC ......... *H04L 29/08729* (2013.01); *H04W 4/001* (2013.01); *H04L 29/08135* (2013.01); *H04L 29/06523* (2013.01)
USPC ............. 709/203; 709/201; 707/770; 712/28; 715/744

(58) Field of Classification Search
CPC ........ H04L 69/329; H04L 29/06; H04L 67/10
USPC ......... 709/220, 219, 218, 217, 205, 204, 202, 709/238, 237, 203, 206, 227; 719/315, 313; 370/420, 392; 707/770, 714, 641; 382/100, 307, 305, 306
See application file for complete search history.

(56) References Cited

U.S. PATENT DOCUMENTS

| 7,809,848 | B1 * | 10/2010 | McDougall et al. | .......... 709/230 |
| 8,201,082 | B1 * | 6/2012 | Nordstrom et al. | ............ 715/234 |
| 2002/0129026 | A1 * | 9/2002 | Reardon | ......................... 707/10 |
| 2005/0210053 | A1 * | 9/2005 | Focazio et al. | ................ 707/101 |

FOREIGN PATENT DOCUMENTS

JP 2009-157648 7/2009

* cited by examiner

*Primary Examiner* — David Lazaro
*Assistant Examiner* — Charles Murphy
(74) *Attorney, Agent, or Firm* — Foley & Lardner LLP (57) ABSTRACT

In a client processing apparatus, each application program independently performs communication with a server processing apparatus in spite of relevance between the application programs. For example, when plural application programs issue a request at the same timing in correspondence with a user's operation, the operation speed of the application program may become low. A request which occurs at the same timing of a particular request outputted from an application program to the server processing apparatus is previously defined in a communication grouping table. When the application program actually outputs a request, the communication grouping table is referred to, then the request and a request in the table to occur at the same timing are transmitted at once to the server processing apparatus. The server processing apparatus processes the plural requests at once, and returns the result of processing to the client processing apparatus.

7 Claims, 9 Drawing Sheets

| REQUEST URL | RELEVANT REQUEST URL |
|---|---|
| http://hsdlserver.com/map?lat=%1%&lng=%2% | http://hsdlserver.com/adv?lat=%1%&lng=%2% |
| http://hsdlserver.com/adv?lat=%1%&lng=%2% | http://hsdlserver.com/map?lat=%1%&lng=%2% |
| ... | ... |

| REQUEST URL | PROCESSING RESULT |
|---|---|
| http://hsdlserver.com/map?lat=35&lng=135 | <MAP DATA> |
| http://hsdlserver.com/adv?lat=35&lng=135 | <ADVERTISEMENT DATA> |
| ... | ... |

| REQUEST | INPUT | RELEVANCE 1 | ......... | RELEVANCE n |
|---|---|---|---|---|
| URL | A0 | A1 | ......... | An |
| PRESENCE/ABSENCE OF PROCESSING RESULT IN CACHE X (1/0) | 0/1 | 0/1 | ......... | 0/1 |
| REQUEST TRANSMISSION NECESSITY/UNNECESSITY Y (1/0) (Y=1-X) | 0/1 | 0/1 | ......... | 0/1 |

FIG. 11

| URL OF INPUT REQUEST | URL OF RELEVANT REQUEST 1 | ......... | URL OF RELEVANT REQUEST n |
|---|---|---|---|
| A0 | A1 | ......... | An |
| B0 | B1 | ......... | Bn |
| | | | |

METHOD FOR COMMUNICATION BETWEEN SERVER PROCESSING APPARATUS AND CLIENT PROCESSING APPARATUS

INCORPORATION BY REFERENCE

The present application claims priority from Japanese application serial No. 2010-209643, filed on Sep. 17, 2010, the entire contents of which are hereby incorporated by reference into this application.

BACKGROUND

The subject matter disclosed herein relates to a method for communication between plural programs which operate on a client processing apparatus (computer) such as a cellular phone, a car navigation system and a PC, and a server program which operates on a server processing apparatus (computer) coupled to the client processing apparatus via a network.

A user of an Android terminal can freely install an application program from a market on the Internet. The installed application program independently performs communication with a server via the network in accordance with necessity.

Japanese Published Unexamined Patent Application No. 2009-157648 discloses a communication method in which, when plural programs, so-called widgets, operating on a client processing apparatus, respectively perform communication with a server, and requests outputted from the widgets are stored in a buffer provided in a client terminal. Then, when the buffer becomes full or a buffering period is expired, the requests stored in the buffer are transmitted at once toward the server. When response data is received from the server, the received data is analyzed, the widget that issued the request is specified and the response data is returned to the widget. In this manner, it is possible to suppress the frequency of occurrence of network communication and prevent increment in communication traffic.

In use of an application program obtained using the Android terminal from the Android market, cooperative operation between individually-obtained application programs can be realized.

However, since communication between an application program and the server is independently performed by an application program, when data transmission/reception communication occurs many times, the performance may be degraded due to transmission/reception processing load.

When the method disclosed in Japanese Published Unexamined Patent Application No. 2009-157648 is used, since requests are temporarily stored in a buffer and the requests are not transmitted until the buffer becomes full or the buffering period is expired, the amount of communication can be reduced. However, it is possible that reception of a response is delayed when a request from an application program is not immediately issued.

SUMMARY

The present invention has been made in consideration of the above situation, and provides a communication method for improvement in processing performance of a client apparatus on which plural independent programs such as widgets operate by reducing the frequency of communication. Especially, a communication method for improvement in response to a user operation is disclosed.

According to the present invention, provided is the following communication method.

(1) In a case where a first application program and a second application program related to the first application program operate simultaneously on a client processing apparatus, when the second application program frequently transmits a second request to a server processing apparatus at the timing of transmission of a first request from the first application program to the server processing apparatus, the relevance between the first request and the second request related to the first request is stored in a communication grouping table of the client processing apparatus.

(2) A server communication interface function in the client processing apparatus performs interfacing all the requests occurred from the application programs toward the server processing apparatus.

(3) When the server communication interface function detects the first request, it searches for a request of the same type as that of the first request from the communication grouping table. When there is a description of the first request, the server communication interface function generates a second request, then combines the first and second requests and transmits the combined request to the server processing apparatus.

(4) When the server processing apparatus receives the combined request, it performs processing respectively corresponding to the first request and the second request, then combines the processing results and returns the combined result to the client processing apparatus.

(5) When the server communication interface function receives the processing result, analyzes the processing result, returns the processing result corresponding to the first request to the first application program, and stores the other processing result into a server communication cache.

(6) When the server communication interface function detects the second request transmitted from the second application program, it determines whether or not a processing result corresponding to the second request exists in the server communication cache. When a processing result corresponding to the second request exists in the server communication cache, the server communication interface function returns the processing result to the second application program.

According to the present invention, as communication individually performed by application programs operating on the client processing apparatus is performed at once, it is possible to improve the performance of application programs.

These and other benefits are described throughout the present specification. A further understanding of the nature and advantages of the invention may be realized by reference to the remaining portions of the specification and the attached drawings.

DETAILED DESCRIPTION OF THE EMBODIMENTS

The example identifiers such as domain names, URLs (Uniform Resource Locators), URIs (Uniform Resource Identifiers) and IP addresses depicted herein are fictional, and any correspondence to any real identifiers is coincidental.

First Embodiment

Figure 1:
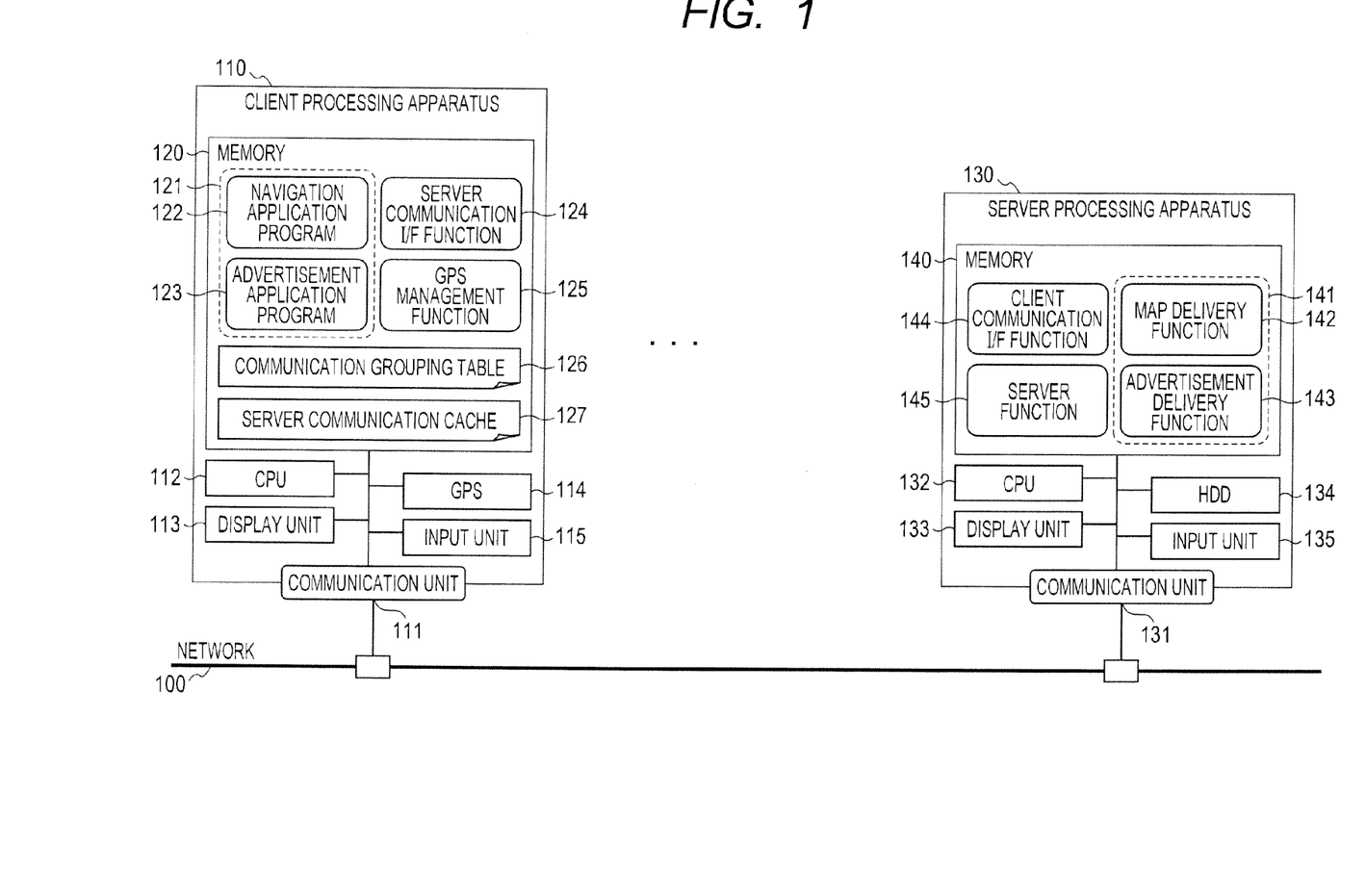
FIG. 1 is a block diagram showing a configuration of a first embodiment.

FIG. 1 is a block diagram showing a configuration of a system of a first embodiment.

In the present embodiment, a car navigation terminal is used as a client processing apparatus 110, and communication is performed via a server processing apparatus 130 and a network 100 to perform processing.

The processing apparatuses (110, 130) are computers respectively having a CPU (112, 132), an input unit (115, 135), a display unit (113, 133), a communication unit (111, 131), a memory (120, 140) and the like.

The CPU (112, 132) reads a program and data into a memory (120, 140) and performs processing in accordance with the program. The display unit (113, 133) displays the result of processing by the CPU (112, 132) for a user, and the input unit (115, 135) accepts an input from the user. The communication unit (111, 131) performs data transmission/reception via the network 100 with another processing apparatus. Further, the client processing apparatus 110 is provided with a GPS 114 for acquisition of a vehicle self position.

The memory 120 of the client processing apparatus 110 holds a server communication interface function 124 and a GPS management function 125 as programs, an application program group 121, a communication grouping table 126 as data, and a server communication cache 127.

The memory 140 of the server processing apparatus 130 holds a client communication interface function 144, a server function 145, and a provided function group 141 as programs.

The application program 121 of the client processing apparatus 110 performs communication with the server processing apparatus 130 to perform processing.

In the present embodiment, two application programs, navigation application program 122 and advertisement application program 123, will be described.

Figure 2:
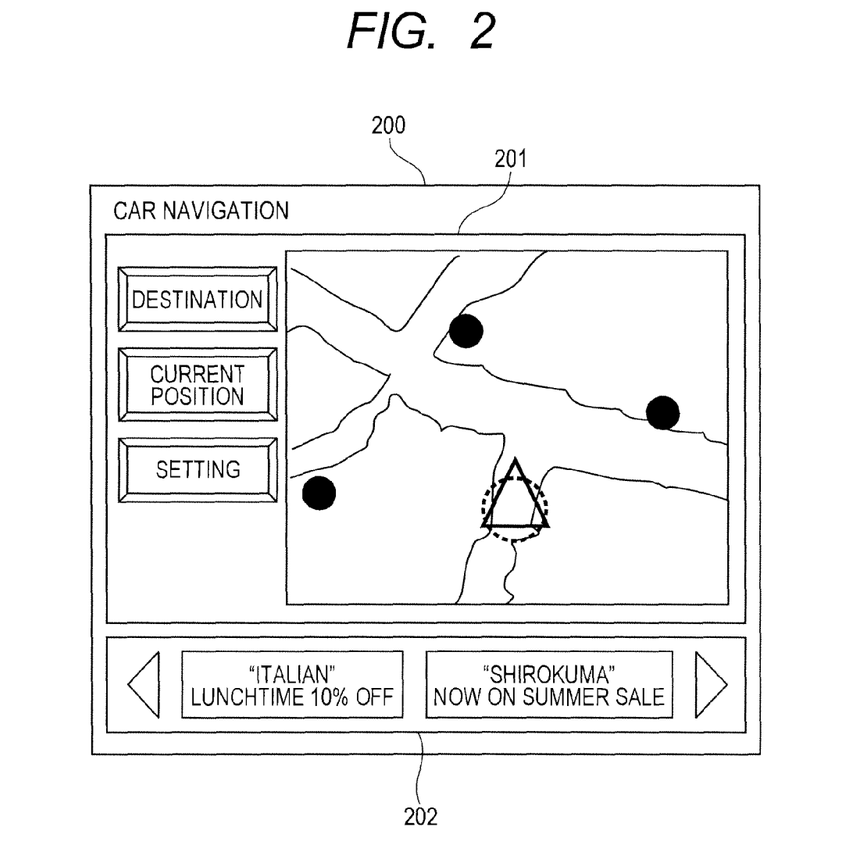
FIG. 2 illustrates an operation example of an application program on a car navigation system.

FIG. 2 shows a screen 201 of the navigation application program and a screen 202 of the advertisement application program as an operation example of applications operating on a car navigation system as a client processing apparatus.

The navigation application program 122 has a function of obtaining a vehicle self position from a GPS device, displaying the position on a map, searching for a route to a destination, and guiding the vehicle to the destination.

The advertisement application program 123, having a function of displaying advertisements of shops on the periphery of the vehicle self position, automatically changes the contents of the advertisements in accordance with update of the vehicle self position.

At this time, map data displayed by the navigation application program 122 is obtained from a map delivery function 142 of the server processing apparatus 130, and the advertisement data displayed by the advertisement application program 123 is obtained from an advertisement delivery function 143 of the server processing apparatus 130.

The map data is managed by grid partitioned map. The acquisition of map data is realized by transmitting latitude and longitude at an upper left corner of a grid partitioned map, for example, to the map delivery function 142.

When a Web server is used as the server function 145 of the server processing apparatus 130, the map data is obtained by transmitting a request to, e.g., the following URL.

http://hsdlserver.com/
  map?lat=35.584653&lng=139.524095

In the above URL, "35.584653" and "139.524095" are latitude and longitude values at the upper left corner of the grid. Further, "map" is used for specifying the provided function 141. In this case, "map" indicates that the map delivery function 142 is used. When the request is transmitted to this URL, the server function 145 sends the latitude and the longitude to the map delivery function 142, then the map delivery function 142 returns map data.

The advertisement data manages shops existing in the grid partitioned map as in the case of map data. The acquisition of advertisement data is realized by transmitting latitude and longitude at an upper left corner of a grid partitioned map, for example, to the advertisement delivery function 143.

The advertisement data is obtained by transmitting a request to e.g. the following URL.

http://hsdlserver.com/adv?lat=35.584653&lng=139.524095

In the above URL, "35.584653" and "139.524095" are latitude and longitude values at the upper left corner of the grid. Further, "adv" is used for specifying the provided function 141. In this case, "adv" indicates that the advertisement delivery function 143 is used. When the request is transmitted to this URL, the server function 145 sends the latitude and the longitude to the advertisement delivery function 143, then the advertisement delivery function 143 returns advertisement data.

It may be arranged such that as a vehicle self position, in place of latitude and longitude, a mesh code uniquely assigned to each block of grid-partitioned map data is used.

Recently, in use of terminals such as cellular phones, as represented by iPhone (registered trademark) and Android (registered trademark), platforms to enable users to freely install application programs to terminals are popularized. The navigation application program 122 and the advertisement application program 123 are also proprietary programs on the assumption that they are freely installed and used by the users.

Although these applications are proprietary programs, since the navigation application program 122 and the advertisement application program 123 both perform communication with the server processing apparatus 130 in accordance with vehicle self position, communication from the two programs occurs at timings close to each other.

Figure 3:
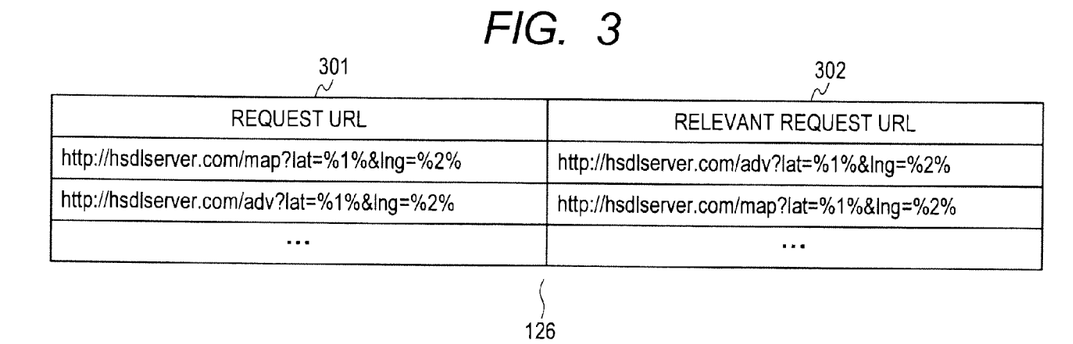
FIG. 3 illustrates an example of the structure of a communication grouping table.

To pack the two programs' communication at close timings, data as shown in FIG. 3 is stored in the communication grouping table 126 of the client processing apparatus 110.

In the communication grouping table 126, a URL called by the application program is stored in a request URL 301, and a URL of a request with high probability of occurrence at the same timing is stored in a relevant request URL 302.

The communication grouping table 126 may be generated by a user, a car navigation terminal maker, an application program developer or the like or may be generated automatically in consideration of combination of application programs.

Figure 4:
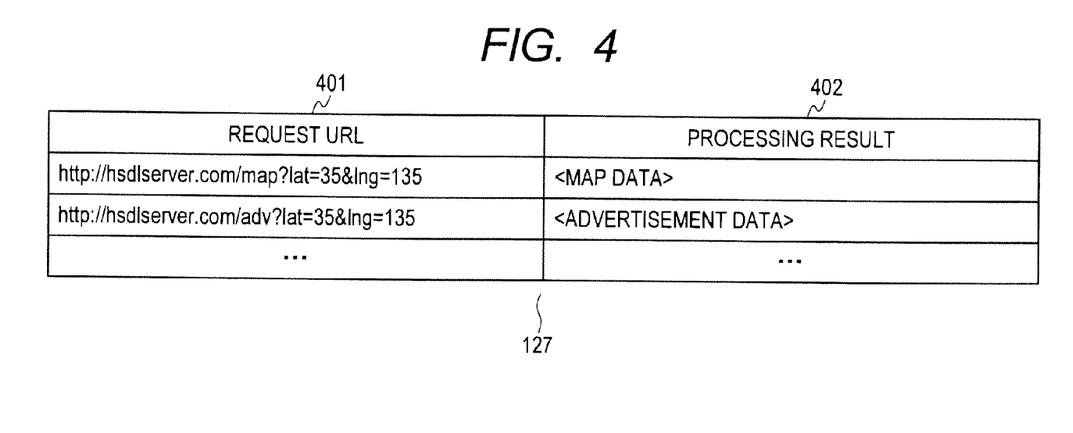
FIG. 4 illustrates an example of the structure of a server communication cache.

FIG. 4 shows the server communication cache 127. A request URL 401 and a processing result 402 upon execution of the request are stored in the server communication cache 127. The contents of the "map data" and "advertisement data" are not stated.

Figure 5:
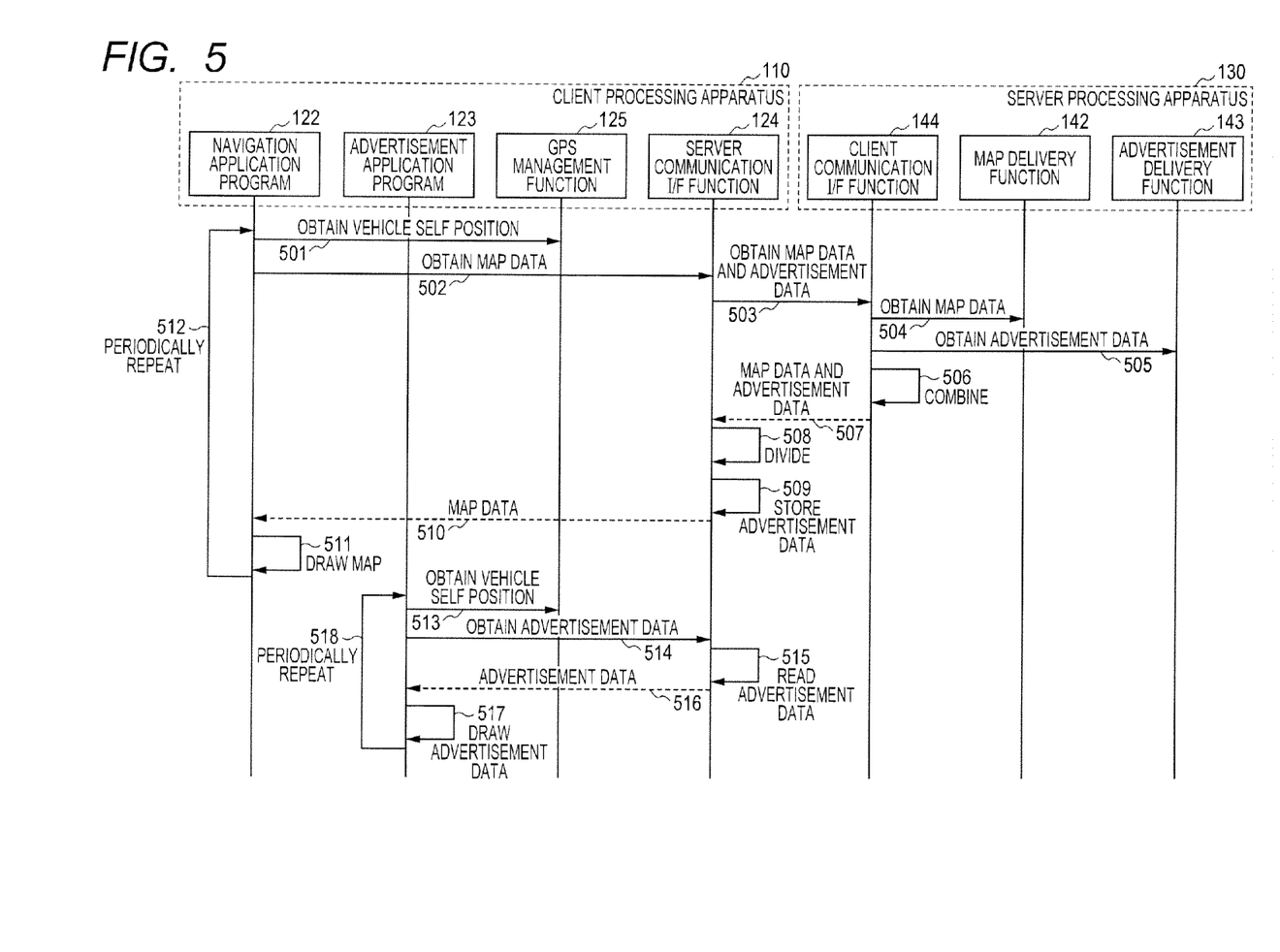
FIG. 5 is a sequence diagram of a communication-related part.

FIG. 5 is a sequence diagram of a part related to application program communication.

The car navigation application program periodically repeats processing to update a vehicle self position on the map (512).

In the update processing, first, a vehicle self position acquisition request 501 is transmitted to the GPS management function 125, and a vehicle self position is obtained.

When a map necessary to display the vehicle self position is insufficient, the car navigation application program issues a map data acquisition request 502 to the map delivery function 142.

When the server communication interface function 124 detects the map data acquisition request 502, the server communication interface function 124 converts the request URL 301 into the relevant request URL 302 in accordance with data in the communication grouping table 126, then packs the both requests as one request, and transmits the request as a map data and advertisement data acquisition request 503 to the client communication interface function 144.

The client communication interface function 144 analyzes the map data and advertisement data acquisition request 503, transmits a map data acquisition request 504 to the map delivery function 142 and an advertisement data acquisition request 505 to the advertisement delivery function 143, and obtains map data and advertisement data. When the map data and the advertisement data are obtained, the client communication interface function 144 pack-combines the two data pieces into one data piece (506), returns the data to the server communication interface function 124 (507). The server communication interface function 124 divides the combined data into map data and advertisement data (508), stores advertisement data into the server communication cache 127 (509), and returns the map data to the car navigation application program (510).

By the above-described processing, the two requests for data acquisition from the client processing apparatus 110 are packed as one request and transmitted to the server processing apparatus 130. Then two data pieces corresponding to the respective two requests are packed as one data piece and transmitted from the server processing apparatus 130 to the client processing apparatus 110.

The navigation application program 122 uses the map data to perform map drawing 511.

The advertisement application program 123 periodically obtains advertisement data on the periphery of the vehicle self position and updates the advertisements (518).

The advertisement application program 123 issues a vehicle self position acquisition request 513 to the GPS management function 125 in accordance with change of vehicle self-position on the periphery of the vehicle self position, to obtain a vehicle self position.

The advertisement application program 123 determines whether or not it is necessary to obtain new advertisement data, and when it is necessary to obtain new advertisement data, issues an advertisement data acquisition request 514 to the advertisement delivery function 143 via the server communication interface function 124 and the client communication interface function 144.

In the present sequence, when the server communication interface function 124 detects the advertisement data acquisition request 514 and advertisement data already exists in the server communication cache 127, a request is not issued to the server processing apparatus 130 but the stored advertisement data is read (515) and returned to the advertisement application program 123 (516).

The advertisement application program 123 draws the advertisement data (517).

Figure 6:
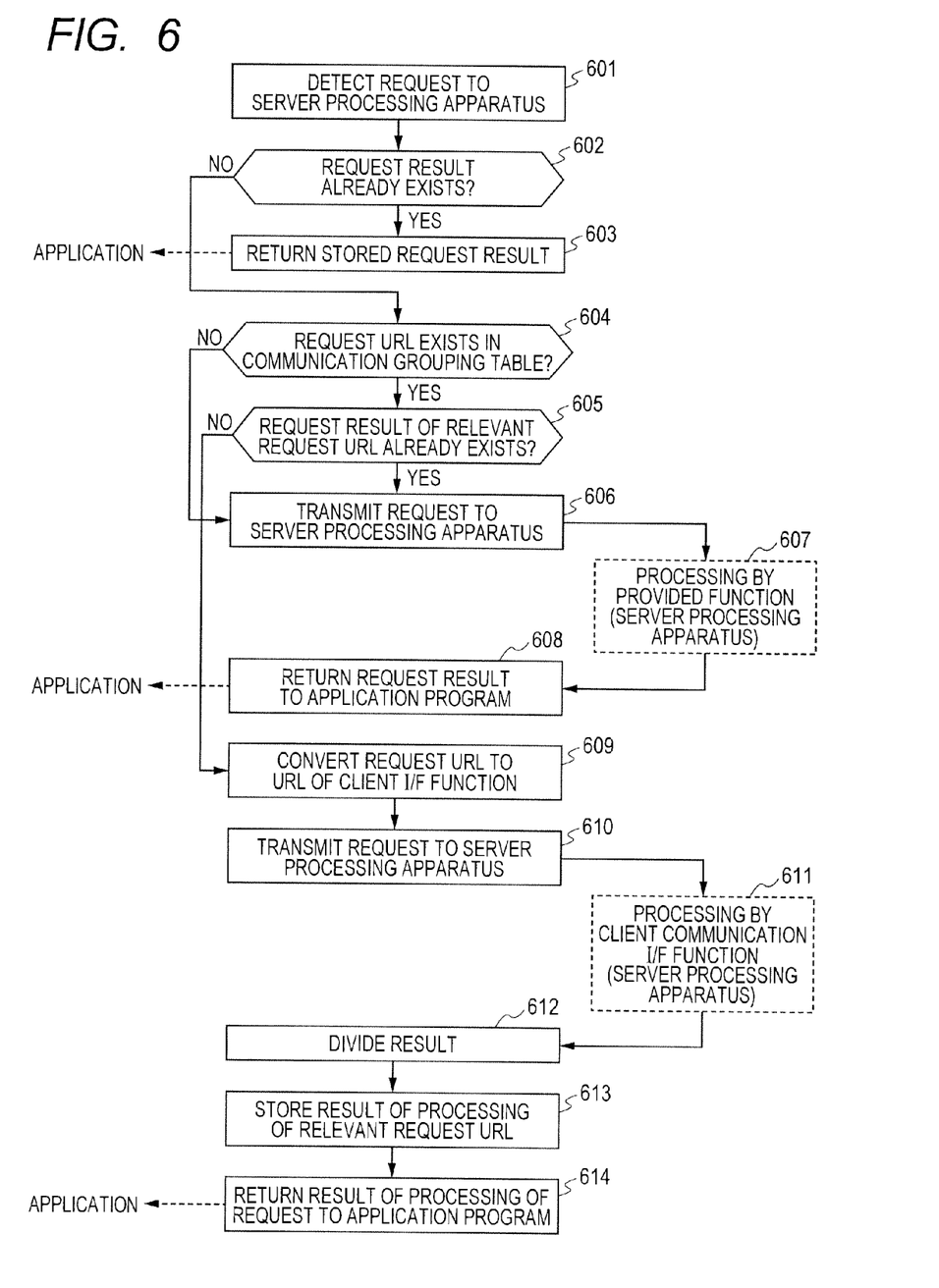
FIG. 6 is a flowchart of a server communication interface function.

The details of the server communication interface function 124 which operates on the client processing apparatus 110 will be described.

FIG. 6 is a flowchart of the server communication interface function 124 which operates on the client processing apparatus 110.

When a request from an application to the server processing apparatus is detected (601), it is determined whether or not the result of processing of the request already exists in the server communication cache 127 (602).

When it is determined that the processing result exists, the stored result of processing of the request is returned (603). In many cases, also the result of processing of a relevant request already exists, accordingly, processing at normal times is performed on the relevant request. When it is determined that the processing result does not exist, it is determined whether or not a request URL exists in the communication grouping table 126 (604). When no request URL exists, the request is transmitted to the server processing apparatus 180 (606).

When a request URL exists, it is determined whether or not the result of processing of simultaneous request URL in the communication grouping table 126 already exists in the server communication cache 126 (605).

The operation at this time will be described using FIG. 3.

In the first entry in FIG. 3, the relevant request URL 302 upon occurrence of request to "map" is a request of "adv". Numerals "%1%" and "%2%" included in the request URL 302 are latitude and longitude set by the application program. Numerals "%1%" and "%2%" included in the relevant request URL 302 indicate that the same values as the latitude and the longitude set by the application program can be used. By setting the same variable names in parameters included in the respective request and relevant request, the relevance of parameters between the request and the relevant request can be defined. The relevant request URL 302 is generated by replacing "%1%" and "%2%" with actual values.

In this example, the parameters set by the application program with respect to the respective URLs are used without any change. However, results of some calculation may be used as parameters. In such case, the relevance between parameters is defined in the grouping table. For example, respectively different values are set for the request and its relevant request using the two parameters "%1%" and "%2%" as follows.

request URL:http// . . . ?a=%1%&b=%2%
relevant request URL:http:// . . . ?ab=%1%+%2%

Then it is determined whether or not a processing result corresponding to the generated URL exists in the server communication cache 126 (605).

When it is determined that a processing result corresponding to the generated URL exists in the server communication cache 126, the request from the application program is transmitted without any change to the server processing apparatus 130 (606).

The server processing apparatus receives the request with the server function 145, performs processing by the requested provided function 141, and returns the processing result to the server communication interface function 124 (607). The server communication interface function 124 returns the result of the request to the application program (608).

When there is no processing result of the request with respect to the relevance request URL (605), the relevant request URL is converted into a URL of the client interface function 144 (609) as follows.

http://hsdlsever.com/proxy?s1=<request URL>&s2=<relevant request URL>

At this time, as the <request URL> and <relevant request URL>, encoded URLs are employed so as to use a character which cannot be used as a request parameter.

When the request URL is converted to the URL of the client interface function 144, the request is transmitted to the server processing apparatus 130 (610).

When the server function 145 of the server processing apparatus 130 receives the request, client communication interface function processing 611 is called, and the processing result is returned.

When the server communication interface function 124 receives the processing result, the server communication interface function 124 divides the processing result by result of each provided function (612).

Next, the server communication interface function 124 stores the result of processing of the relevant request URL into the server communication cache (613), and returns the result of processing of the request, outputted from the application program, to the application program (614).

Note that in anticipation of occurrence of request of a relevant request URL in the client processing apparatus 110 during processing in the server processing apparatus 130, it may be arranged such that the URL in the request is recorded in the client processing apparatus 110 after transmission of the request to the server processing apparatus 130 (610). When a request to the relevant request URL occurs, the URL in the request is referred to. When the relevant request exists in the request URL, the request is not issued to the server processing apparatus 130 but the result of processing of the relevant request included in the URL of the request is waited.

Figure 7:
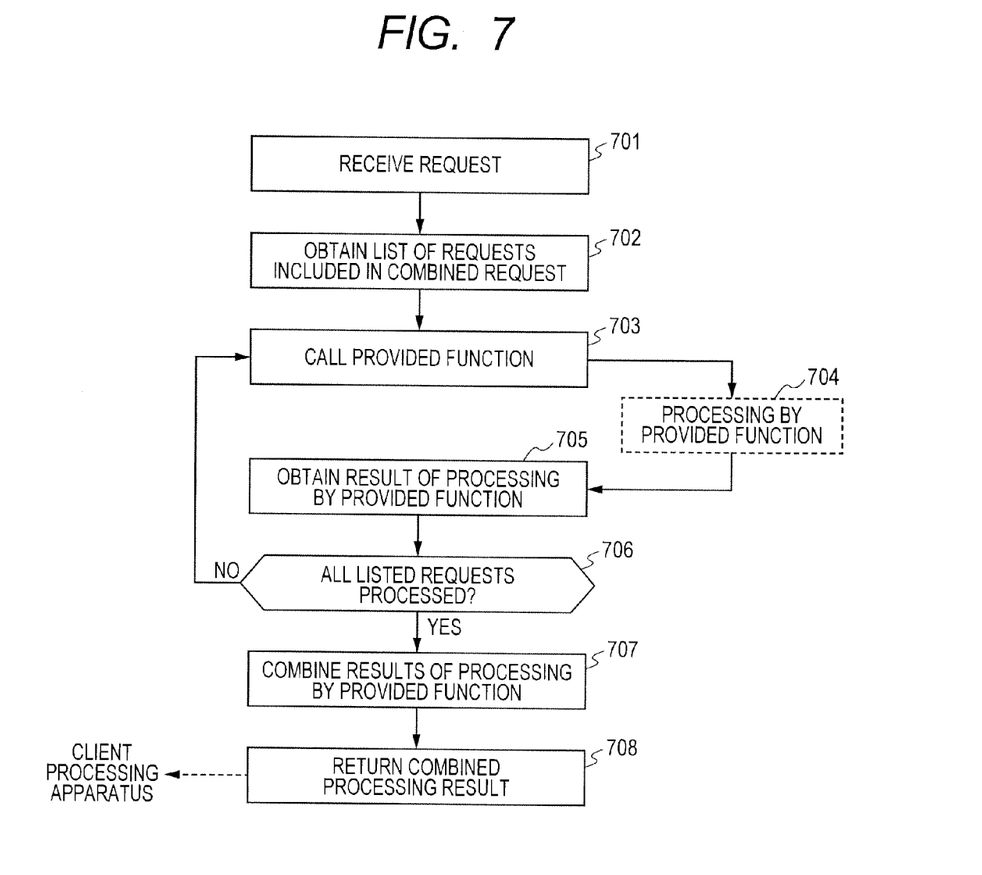
FIG. 7 is a flowchart of a client communication interface function.

FIG. 7 is a flowchart of the client communication interface function 144 which operates on the server processing apparatus 130.

When a request is received (701), a list of requests included in a combined request is obtained (702).

A provided function as a request destination is called (703), then the processing by the provided function is performed (704), and the result of processing by the provided function is obtained (705).

It is determined whether or not all the requests in the list have been processed (706), and when it is determined that all the requests have not been processed, the next provided function is called (703).

When it is determined that all the requests have been processed, the results of processing by the provided function are combined (707). As a method for combining, compression by e.g. ZIP can be used.

The combined processing result is returned to the client processing apparatus 110 (708).

When the server communication interface function 124 of the client processing apparatus 110 receives the processing result, step 612 to divide the result and the subsequent steps are performed.

In the present embodiment, with the vehicle self position acquisition (501, 513) from the GPS management function 125 as a turning point, the application programs work with each other. Further, processing may be performed, with the timing of direct action such as the user's screen operation and calling by a particular application program for a function of another application, as a turning point.

As described above, it is possible to reduce the frequency of data transmission/reception from the client processing apparatus 110 to the server processing apparatus 130 conventionally performed by each application program 121 independently, and further, it is possible to reduce the load on the communication.

Second Embodiment

In the first embodiment, an example where the respective provided functions 141 operate on one server processing apparatus 130 has been described.

Figure 8:
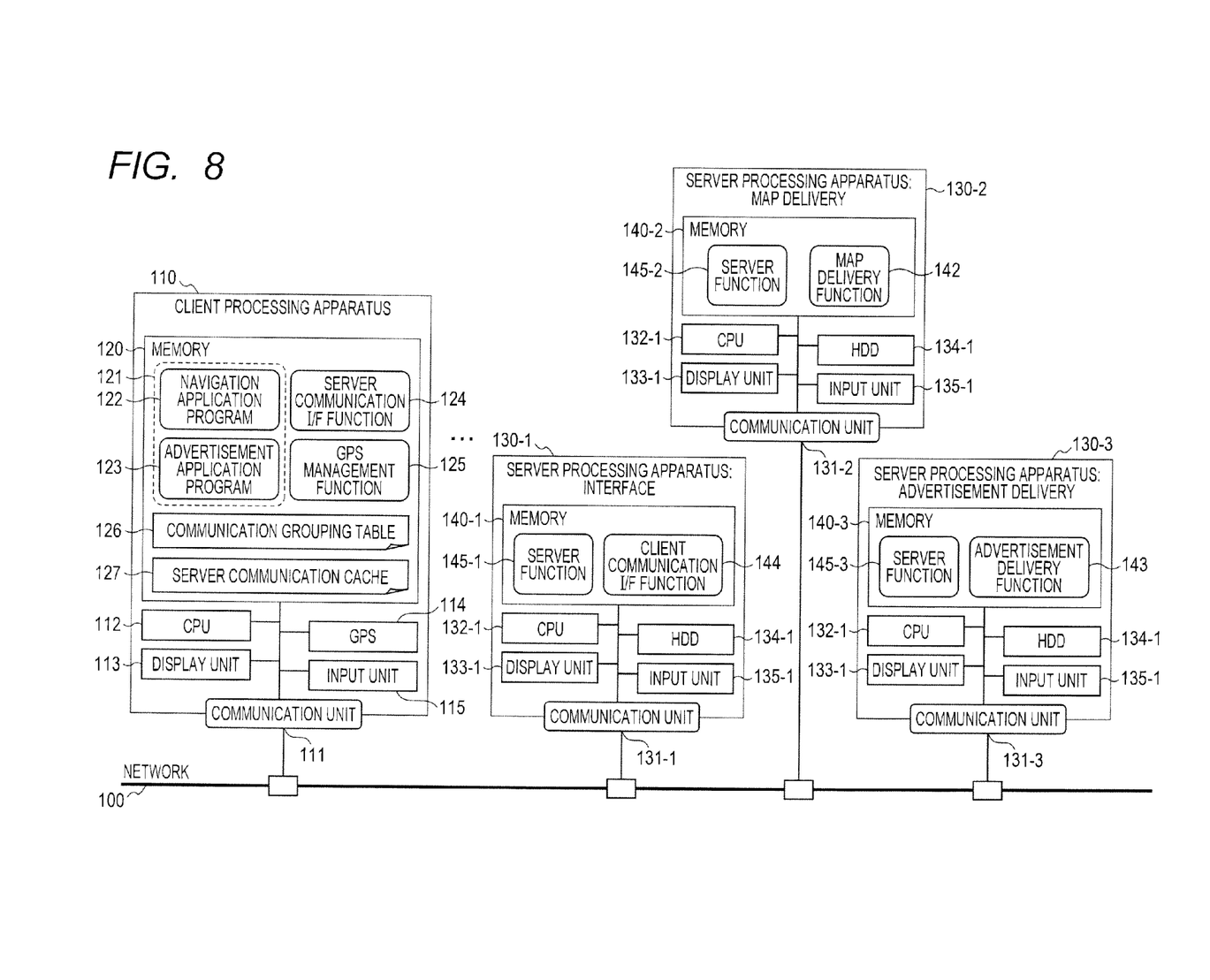
FIG. 8 is a block diagram showing a configuration of a second embodiment.

In the second embodiment, the respective provided functions 141 and the communication interface function 144 operate on respectively-one server processing apparatuses 130-1 to 130-3.

FIG. 8 is a block diagram showing a configuration of a system of the second embodiment.

The map delivery function 142 and the advertisement delivery function 143 are provided in a server processing apparatus: map delivery 130-2 and a server processing apparatus: advertisement delivery 130-3.

The client communication interface function 144 is provided in a server processing apparatus: interface 130-1.

In the present system, the request URL 301 and the relevant request URL 302 stored in the communication grouping table 126 are URLs of respectively different server communication processing apparatuses 130.

In this manner, the client communication interface function 144, the map delivery function 142, and the advertisement delivery function 143 of the server processing apparatus in FIG. 5 operate on respectively different server processing apparatuses 130.

In FIG. 7, the provided function call 703 is a request to the respectively different server processing apparatuses 130, and the processing by the provided functions 141 is performed in respectively different server processing apparatuses 130.

The flow of processing is similar to that in the first embodiment. Note that transmission of a request URL (map delivery function) and transmission of a relevant request URL (advertisement delivery function) from the client processing apparatus 110 to the server processing apparatus 130-1 are performed at once. The respective processing results are transmitted at once from the server processing apparatus 130-1 to the client processing apparatus 110.

This arrangement is advantageous when the communication speed from the client processing apparatus 110 to the server processing apparatus: interface 130-1 is low while the communication speed between the server processing apparatus: interface 130-1 and the server processing apparatus: map delivery 130-2 and between the server processing apparatus: interface 130-1 and the server processing apparatus: advertisement delivery 130-3 is high, or when the throughput speed of the server processing apparatus: interface 130-1 is higher in comparison with the client processing apparatus 110. In such case, as described above, since a request URL and its relevant request URL are transmitted at once from the client processing apparatus 110 to the server processing apparatus 130-1, and further, the results of processing with respect to the respective requests are also transmitted at once from the server processing apparatus 130-1 to the client processing apparatus 110, the time of transmission of the requests and processing results can be reduced.

Third Embodiment

An embodiment where the communication grouping table 126 is automatically generated in the first embodiment will be described.

In FIG. 1, the memory 120 of the client processing apparatus 110 is newly provided with a communication grouping table update function.

In the flowchart of the server communication interface function 124 in FIG. 6, after processing to transmit the request to the server processing apparatus 130, processing to record the request URL and request transmission time on a log is added.

Figure 9:
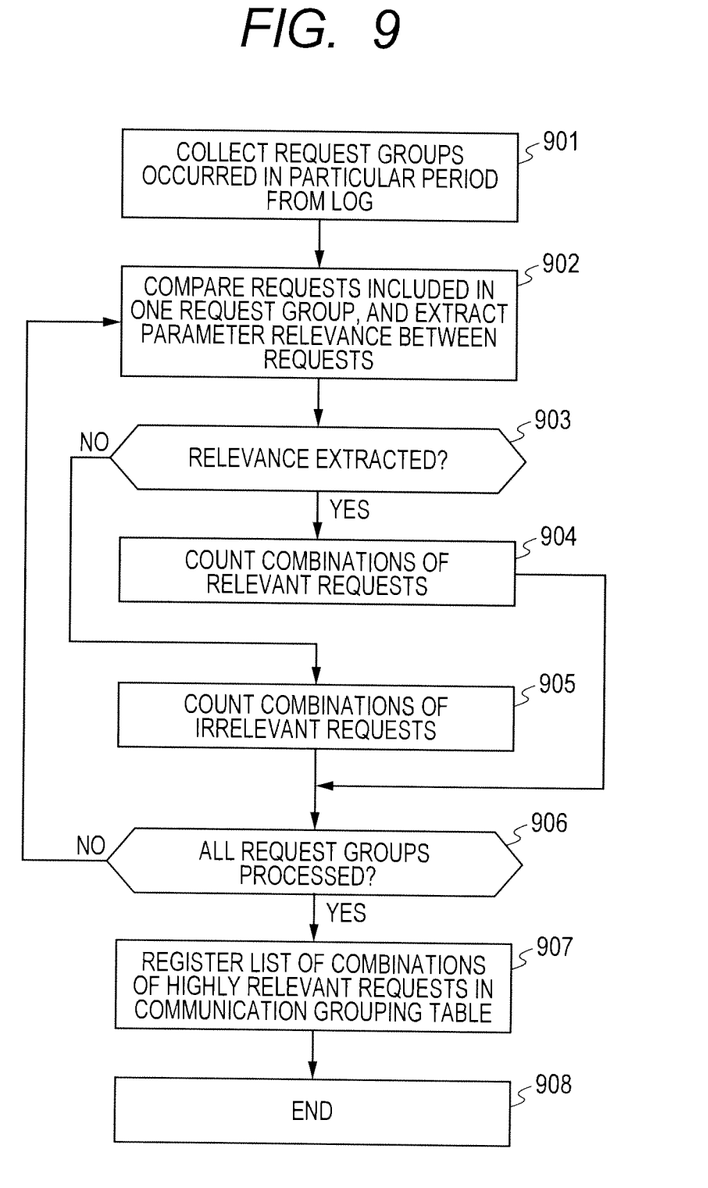
FIG. 9 is a flowchart of a communication grouping table update function.

The communication grouping table update function analyzes collected logs and finds two requests which frequently occur at timings close to each other. When relevance exists between these two requests, the communication grouping table update function registers the request URL 301 and the relevant request URL 302 in the communication grouping table 126. FIG. 9 is a flowchart of the communication grouping table update function processing.

First, request groups occurred within a predetermined period are collected from a log (901). For example, logs with a time difference within 5 seconds with respect to a particular log are collected as one request group.

Next, requests included in one request group are compared and the relevance between parameters between the requests is extracted (902). For example, in a case where the following two requests occur within a particular period and the parameters are compared, since the value set as "lat" and "lng" (latitude and longitude) are the same, it is determined that the relevance is obtained.

http://mapsever.com/
        getmap?lat=35.584653&lng=139.524095
    http://advserver.com/
        getadv?lat=35.584653&lng=139.524095

When the relevance is extracted based on parameters included in the request (903), combinations of requests having relevance are counted (904). For example, in the case of the above two URLs, the frequency of extraction of relevance with respect to combination between the http://mapserver.com/getmap and http://advserver.com/getadv is incremented by 1.

Conversely, when no relevance is extracted, the combinations of requests without extraction of relevance are counted (905).

It is determined whether or not all the request groups have been processed (906), and when all the request groups have not been processed, the processing is repeated from step 902.

When it is determined that all the request groups have been processed, combinations of requests with high relevance are registered in the communication grouping table (907). As a method for judging relevance level, for example, when there is relevance regarding a combination of particular requests but the frequency of extraction of no relevance is zero, or when the frequency of extraction of relevance regarding particular combination of requests is 50% or higher with respect to the sum of the frequency of extraction of relevance and the frequency of extraction of no relevance, it is determined that there is relevance.

When a combination of request with high relevance is registered in the communication grouping table, the values of parameters included in the URL become variables such as "%1%" and "%2%".

When all the combinations with high relevance have been registered as requests and their relevant requests in consideration of the order of occurrence of requests in the communication grouping table, the process ends (908).

By periodically performing this processing, the contents of the communication grouping table 126 can be updated in accordance with characteristic of combination of plural applications 121.

Fourth Embodiment

An embodiment where plural relevant requests exist regarding a request initially inputted by the user will be described. For example, regarding an inputted request A, the user selects one of relevant requests B and C; otherwise, after the inputted request A, the user selects the relevant request B and then the relevant request C.

Figure 10:
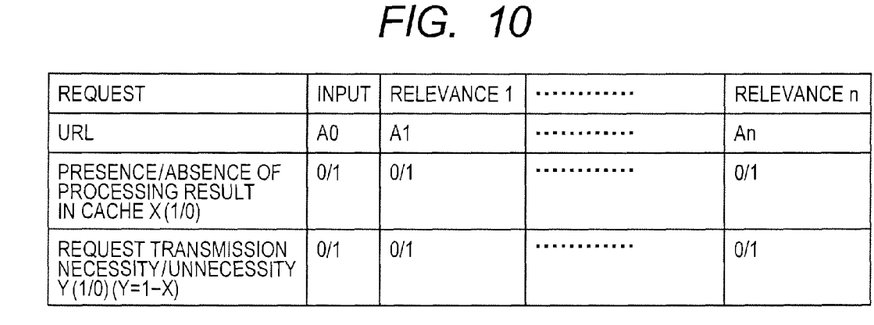
FIG. 10 illustrates an example of the structure of a transmission/reception control table.

FIG. 10 shows a transmission/reception control table for, when plural requests relevant to the inputted request exist, combining and transmitting plural requests and receiving a combined processing result. In FIG. 10, n relevant requests exist regarding an inputted request. FIG. 10 is applicable even when no relevant request exists. The transmission/reception control table in FIG. 10 holds, regarding each of a request and plural relevant requests, a flag X indicating whether or not processing result exists in the server communication cache 127, and a flag Y (Y=1−x) indicating whether or not the request is transmitted to the server processing apparatus 130. As it is apparent from the definition of the flag Y, the flag Y is substantially equivalent to the flag X. That is, the value of the flag Y is determined in accordance with the value of the flag X.

Figure 11:
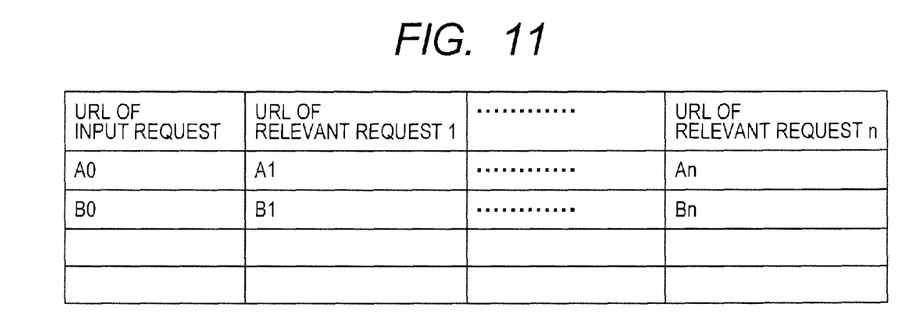
FIG. 11 illustrates an example of the structure of the communication grouping table when plural relevant requests exist.

FIG. 11 illustrates an example where the communication grouping table 126 shown in FIG. 3 is expanded when plural relevant requests exist. In the table shown in FIG. 11, as described in the third embodiment, the relevance between requests is previously defined based on a communication log.

The processing procedure in the client processing apparatus 110 when plural relevant requests exist will be described below. The following procedure is applicable even when there is no relevant request and only the request exists.

(1) When a request occurs in the client processing apparatus 110, the communication grouping table shown in FIG. 11 is referred to, and URLs of the input request and relevant requests are set in the transmission/reception control table in FIG. 10.

(2) It is determined whether or not a processing result exists in the server communication cache 127, and 1 (present) or 0 (absent) is set in the flag X in the table in FIG. 10 in accordance with the presence/absence of processing result.

(3) The value of a complement of the flag X is set in the request transmission necessity/unnecessity flag Y in the table in FIG. 10. That is, when the flag X is 0, 1 is set in the flag Y, while when the flag X is 1, 0 is set in the flag Y. (when a processing result exists in the server communication cache 127, the request is not transmitted to the server processing apparatus 130, while when a processing result exists, the request is transmitted.)

(4) The processing results corresponding to respective requests, regarding which the flag X in FIG. 10 is 1, are extracted from the server communication cache 127 and returned to the respective applications.

(5) The requests regarding which the flag Y in FIG. 10 is 1 are combined to one request and transmitted to the server processing apparatus 130. When the combined processing result is received from the server processing apparatus 130, the combined processing result is divided and stored in the server communication cache.

The specification and drawings are, accordingly, to be regarded in an illustrative rather than a restrictive sense. It will, however, be evident that various modifications and changes may be made thereto without departing from the spirit and scope of the inventions as set forth in the claims.

What is claimed is:

1. A communication system comprising:
a client processing apparatus configured for the cooperative operation of a plurality of programs; and
a server processing apparatus, coupled to the client processing apparatus, configured to perform processing corresponding to a request from a program,
wherein, when a first request transmitted by a first program to a first URL of the server processing apparatus and a second request transmitted to a second URL of the server processing apparatus by a second program called from the first program are related to each other and are defined in a communication grouping information in the client processing apparatus, the client processing apparatus is configured to:
when the first request is transmitted from the first program, even if the second request has not been transmitted to the server processing apparatus, extract the second request from the communication grouping information, combine the first request and the second request, and transmit the combined request to a third URL of an interface function of the server processing apparatus,
wherein the server processing apparatus is further configured to:
have the interface function call a first provided function with the first URL for processing the first request and obtaining a first processing result and call a second provided function with the second URL for processing the second request and obtain a second processing result; and
combine the first and second processing results and return a combined result to the client processing apparatus, and
wherein the client processing apparatus is configured to:
divide the combined processing result and return the first processing result to the first program;
store the second processing result into a cache; and
when the second request is transmitted, return the second processing result in the cache to the second program.

2. The communication system according to claim 1, wherein, when the second request is transmitted before receiving the combined processing result, after having transmitted the first request to the server processing apparatus, the client processing apparatus is further configured to:
not transmit the second request to the server processing apparatus, and
wait for receiving the combined processing result from the server processing apparatus.

3. The communication system according to claim 1,
wherein the interface function, the first provided function, and the second provided function are operated on a different server processing apparatus, and the interface function is configured to call a provided function in the different server processing apparatus according to a request.

4. The communication system according to claim 1, wherein when each of the first request and the second request has a parameter, a relationship between a parameter of the first request and a parameter of the second request is defined in the communication grouping information,
wherein when the first request is transmitted, by using the relationship defined in the communication grouping information, a parameter included in the second request is generated from a parameter included in the first request.

5. The communication system according to claim 1, wherein when the communication grouping information is generated from a history of transmission from the client processing apparatus to the server processing apparatus, the client processing apparatus is configured to:
record a log at the time of request transmission from the client processing apparatus to the server processing apparatus,
analyze, by a communication grouping information update function operated in the client processing apparatus, the collected log,
request which difference of time of request occurrence is less than a particular time are extracted,
estimate an occurrence frequency for the simultaneous transmission of the first request and the second request, and as a result of the estimation, when the first request and the second request are simultaneously transmitted, store the first request and the second request in the communication grouping information.

6. The communication system according to claim 5,
wherein parameter values of the first request and the second request are compared to each other, and when a relationship between the parameter values exists, the first request and the second request are corresponded and stored in the communication grouping information.

7. A communication system comprising:
a client processing apparatus configured to co-operatively operate a plurality of programs; and
a server processing apparatus, coupled to the client processing apparatus, configured to perform processing corresponding to a request from a program,
wherein, when a first request transmitted by a first program to a first URL of the server processing apparatus and a second request transmitted to a second URL by a second program called from the first program are related to each other and are defined in a communication grouping information in the client processing apparatus, the client processing apparatus is further configured to:
when the first request is transmitted from the first program, even if the second request has not been transmitted to the server processing apparatus, set the first request and the at least one of the second requests to a control information for controlling transmission and receipt of the request,
check whether or not a processing result corresponding to each of the first request for the first URL and the at least one of the second request for the second URL already exists in a cache memory, and set a first flag of on-state or off-state corresponding to existence of the processing result to the control information corresponding to the first request and the at least one of the second request,
set a second flag which is a complement of value of the first flag to the control information, corresponding to each of the first request and the at least one of the second requests,
set processing results of each of at least one of the requests of which the first flag to on-state are returned to each of the programs, combine at least one of the requests of which the second flag is set to on-state and set to the server processing apparatus, and if combined processing results are received collectively, divide the received results to store on the cache memory.

* * * * *